United States Patent [19]

Lin et al.

[11] Patent Number: 4,821,920
[45] Date of Patent: Apr. 18, 1989

[54] METHOD AND APPARATUS FOR LOADING ARTICLES ONTO FEEDER BY ELEVATING RAMP SEGMENTS

[75] Inventors: James G. Lin, Springfield; Werner H. Schmitt, Falls Church, both of Va.

[73] Assignee: Hoppmann Corporation, Chantilly, Va.

[21] Appl. No.: 90,685

[22] Filed: Aug. 28, 1987

[51] Int. Cl.⁴ ............................................. B65H 9/00
[52] U.S. Cl. .................................. 221/167; 221/254; 221/258; 198/397
[58] Field of Search ............... 221/254, 156, 158, 159, 221/160, 167, 174, 258; 198/392, 443, 396, 397; 453/49, 57, 6, 12

[56] References Cited

U.S. PATENT DOCUMENTS

| | | | |
|---|---|---|---|
| 2,767,881 | 10/1956 | Gruenberg | 221/157 |
| 2,853,176 | 9/1958 | Kay et al. | 221/167 X |
| 2,904,162 | 9/1959 | Simer . | |
| 2,928,521 | 4/1960 | Johnson . | |
| 3,063,596 | 11/1962 | D'Authevile et al. | 221/7 |
| 3,471,000 | 10/1969 | Bodolay et al. | 198/443 |
| 3,531,092 | 9/1970 | Praschak et al. | 366/181 |
| 3,543,909 | 12/1970 | Ueda . | |
| 3,635,325 | 1/1972 | Sterling . | |
| 3,658,207 | 4/1972 | Schultz | 221/167 |
| 3,669,260 | 6/1972 | Hoppmann et al. . | |
| 3,684,077 | 8/1972 | MacIntyre . | |
| 3,722,674 | 3/1973 | Hoppmann et al. . | |
| 3,826,405 | 7/1974 | Hoppmann et al. | 221/1 |
| 3,831,734 | 8/1974 | Hoppmann et al. | 221/171 X |
| 3,900,107 | 8/1975 | Hoppmann | 221/159 X |
| 3,912,120 | 10/1975 | Hoppmann et al. | 221/7 |
| 3,960,293 | 6/1976 | Sweet, II et al. | 221/258 |
| 3,986,636 | 10/1976 | Hoppmann et al. | 221/7 |
| 4,093,062 | 6/1978 | Sjogren | 198/392 X |
| 4,094,412 | 6/1978 | Hoppmann et al. | 198/443 X |
| 4,098,280 | 7/1978 | Ristvedt et al. . | |
| 4,211,248 | 7/1980 | Lafon | 221/186 X |
| 4,305,496 | 12/1981 | Hoppmann et al. | 198/420 |
| 4,388,989 | 6/1983 | Edmunds et al. | 198/372 X |
| 4,429,808 | 2/1984 | Doty | 221/167 |
| 4,462,508 | 7/1984 | Grafius | 221/201 |
| 4,527,326 | 7/1985 | Kohno et al. . | |

FOREIGN PATENT DOCUMENTS 2757055 12/1977 Fed. Rep. of Germany .

Primary Examiner—Michael S. Huppert
Assistant Examiner—David H. Bollinger
Attorney, Agent, or Firm—Birch, Stewart, Kolasch & Birch

[57] ABSTRACT

An article feeding appartus for supplying articles includes a base member with a side wall member having a first surface and a second surface. The first surface is secured to the base member. A rim member is secured to the second surface of the side wall member. An elevating turret is centrally disposed relative to the base member. A plurality of inclined ramp segments are operatively connected to the elevating turret and radially extend from the centrally disposed elevating turret towards the side wall member for forming a reservoir area into which articles may be supplied. A drive member is provided for rotating the base member, side wall member, rim and elevating turret at a predetermined speed. An elevating member is operatively positioned within said elevating turret and operatively connected to the plurality of ramp segments for sequentially elevating predetermined ramp segments to permit articles deposited within the reservoir section to be transported upwardly and fall by means of gravity outwardly onto the rim.

28 Claims, 6 Drawing Sheets

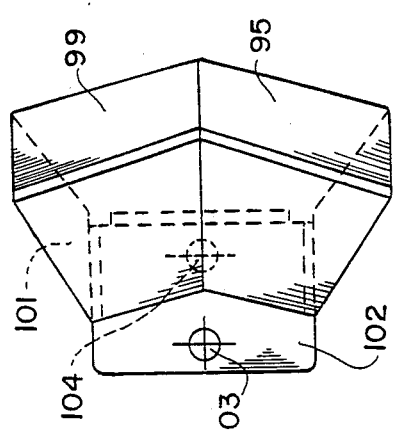
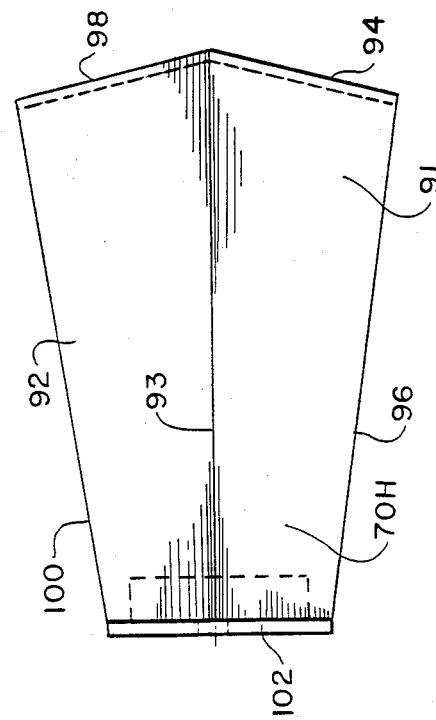
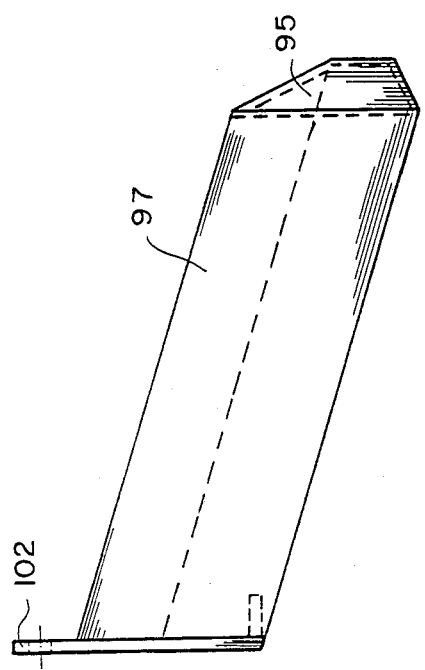
FIG. 5
FIG. 4
FIG. 6

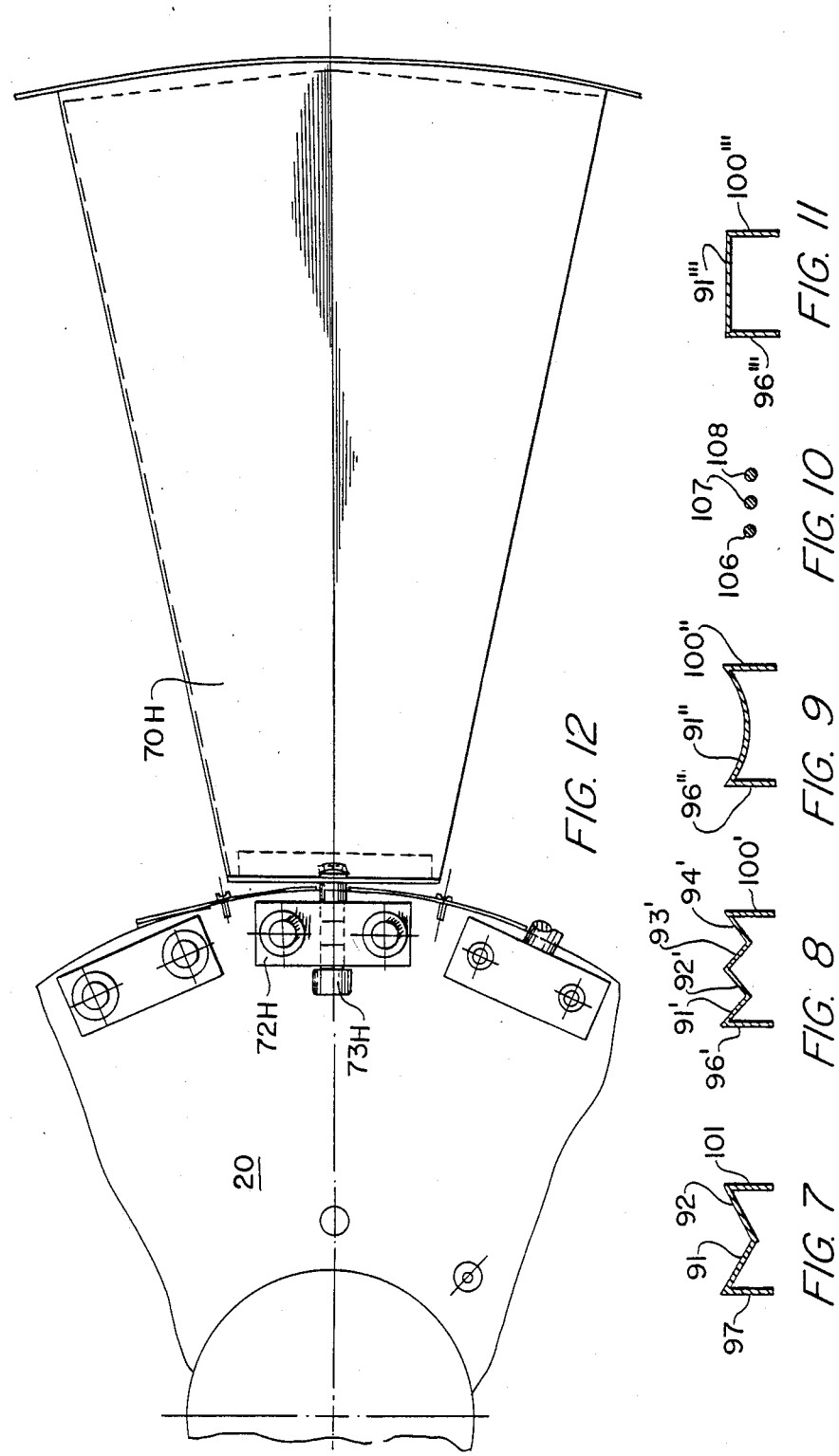

METHOD AND APPARATUS FOR LOADING ARTICLES ONTO FEEDER BY ELEVATING RAMP SEGMENTS

BACKGROUND OF THE INVENTION

1. Field of the Invention

The present invention is directed to a method and apparatus for loading articles onto a feeder rim by utilizing a plurality of elevating ramp sections.

2. Description of Background Art

Hithertofore, article feeding devices have been developed which utilize either a stationary ramp or a rotating disk for elevating articles from a reservoir within a feeder bowl upwardly to a rim. The articles must be accelerated upwardly onto the stationary ramp or the inclined portion of the movable disk to enable the articles to be transferred to the rim section.

Depending on the type of article handled by the feeding apparatus, it may not be desirable to accelerate the articles during the feeding operation. Articles constructed of a material which may be readily scratched or damaged must be gently handled in order to transfer the articles from the feeder bowl to the rim section wherein the articles are qualified and oriented.

SUMMARY AND OBJECTS OF THE INVENTION

It is an object of the present invention to provide an article feeding apparatus wherein the articles are gently elevated from a reservoir section of a feeder bowl upwardly to be deposited on a rotating rim.

Another object of the present invention is to provide an article feeding apparatus wherein a plurality of articles are fed to a rotating rim so as to ensure 100 percent filling of the spaces on the rim for subsequent orientation and qualification.

A further object of the present invention is to provide an article feeding apparatus wherein no centrifugal force is applied to the articles in discharging the articles from the inclined ramp segments onto the rotating rim. The articles are deposited onto the rotating rim due to gravitational forces.

A further object of the present invention is to provide V-shaped ramp segments to avoid bridging and wedging of articles during loading onto the rim section.

A still further object of the present invention is to provide a deep reservoir feeder bowl to contain a large number of articles for subsequent delivery to the rim section.

A still further object of the present invention is to provide a V-shaped ramp segment which preorients articles prior to depositing the articles onto the rim section.

These and other objects of the present invention are accomplished by providing an article feeding apparatus for supplying articles which includes a base member. An upwardly projecting side wall is provided having a first surface affixed to the base member. A rim member is secured to a second surface of the upwardly projecting side wall. An elevating turret is centrally disposed relative to the base member. A plurality of ramp segments are operatively connected to the elevating turret and radially extend from the centrally disposed elevating turret towards the upwardly projecting side wall for forming a reservoir area into which articles may be supplied. A drive member is provided for rotating the base member, upwardly projecting side wall, rim and elevating turret at a predetermined speed. In addition, an elevating member is provided for sequentially elevating predetermined ramp segments to permit articles deposited within the reservoir section to be transported upwardly and fall by means of gravity outwardly onto the rim member.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 4 is a top plan view of one of the ramp segments according to the present invention;

FIG. 5 is an end elevational view of the ramp segment illustrated in FIG. 4;

FIG. 6 is a side elevational view of the ramp segment illustrated in FIG. 4;

FIG. 7 is a cross-sectional view of one of the ramp segments illustrated in FIG. 1;

FIG. 8 is a second embodiment of a ramp segment showing two V-shaped portions;

FIG. 9 is a third embodiment of a ramp segment illustrating a concave central portion;

FIG. 10 is a fourth embodiment of a ramp segment illustrating three rods disposed adjacent to each other;

FIG. 11 is a fifth embodiment of a ramp segment which includes a substantially U-shaped cross section;

FIG. 12 is a partial top plan view showing the connection of a ramp segment with the support shafts.

DETAILED DESCRIPTION OF THE PREFERRED EMBODIMENTS

Figure 1:
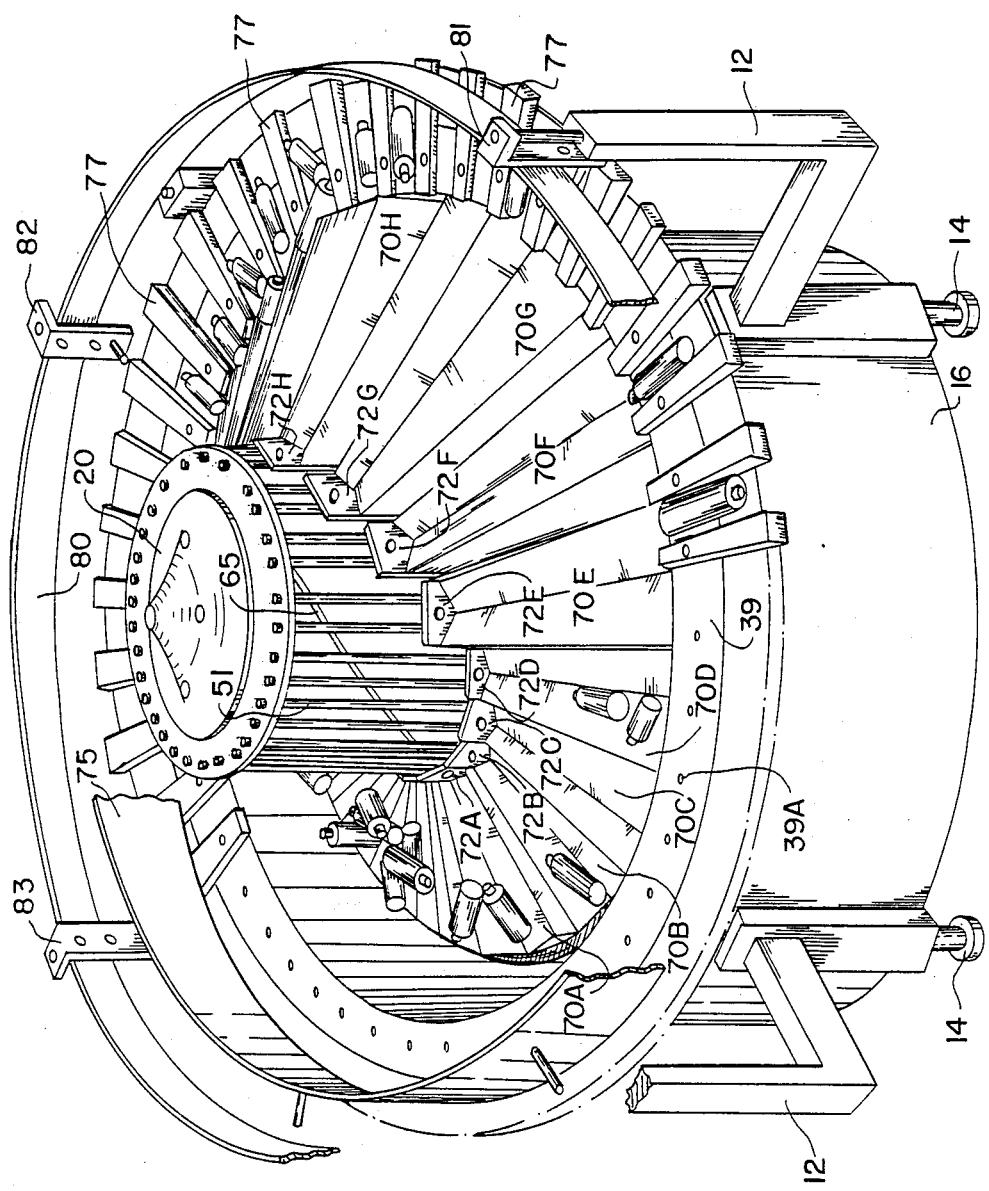
FIG. 1 is a perspective view of an article feeding apparatus according to the present invention.
Figure 2:
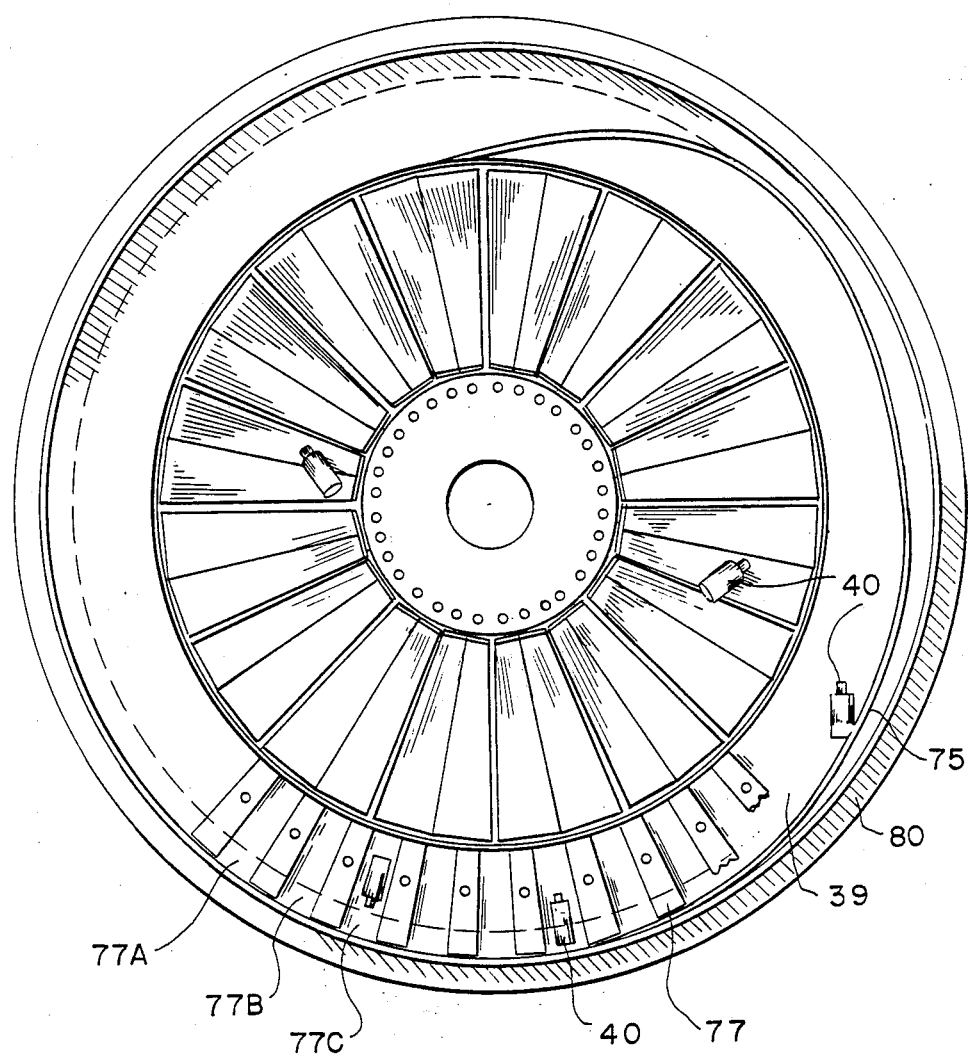
FIG. 2 is a top plan view thereof.
Figure 3:
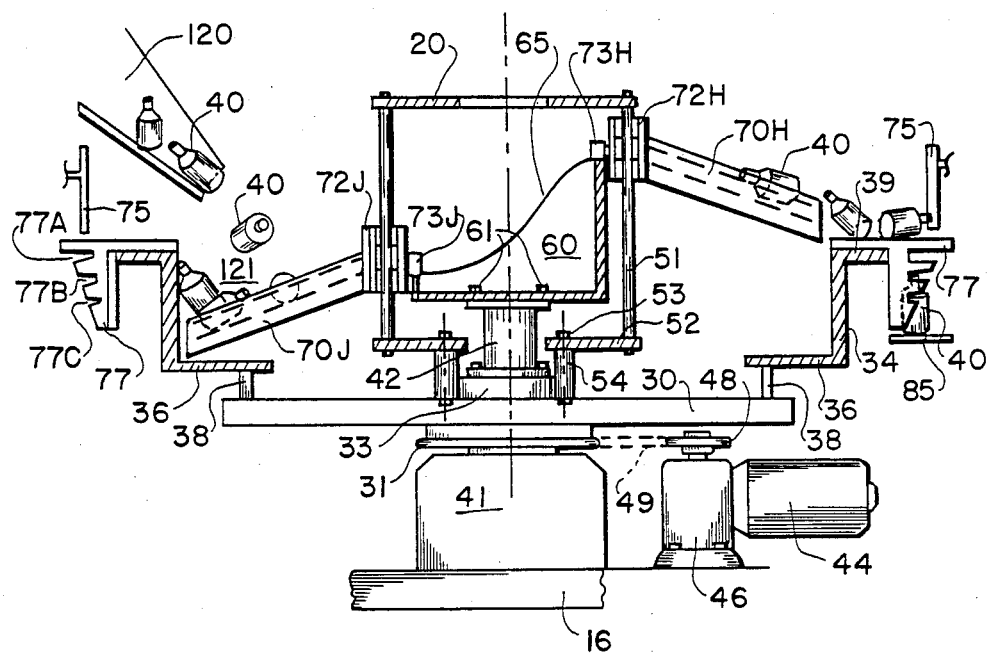
FIG. 3 is a partial cross-sectional view thereof.

As illustrated in FIGS. 1-3, an article feeding apparatus 10 includes a support frame 12 with adjustable legs 14 secured to a housing 16. The adjustable legs 14 permit the adjustment of the frame 12 and housing 16 to ensure that the article feeding apparatus 10 may be leveled relative to a floor surface on which the article feeding apparatus 10 is positioned.

As illustrated in FIG. 3, an elevating turret 20 is centrally disposed relative to a base member 30. The base member 30 is secured to an upwardly projecting side wall 34 by means of an inwardly projecting wall member 36 connected by means of legs 38 to the base member 30. In addition, a rim 39 is affixed to the upwardly projecting side wall 34 and extends outwardly therefrom. The upwardly projecting side wall 34, the inwardly projecting wall member 36, and the rim 39 may be formed as an integral unit for rotation together with the base member 30. The shape of the upwardly projecting side wall 34 and the inwardly projecting wall member 36 forms a portion of a bowl into which articles 40 may be positioned for feeding.

A spindle base 41 is secured to the housing 16. The spindle base 41 includes an upwardly stationary shaft 42. The stationary shaft 42 is a fixed axis which is secured in a fixed relationship relative to the spindle base 41. A motor 44 is secured to a gear drive mechanism 46. The gear drive mechanism 46 is secured to the housing 16. The gear drive mechanism 46 includes an output shaft 47 with a pulley 48 secured to the output shaft 47. A belt or other drive mechanism 49 is mounted for rotation relative to the pulley 48.

The base 30 includes a pulley member 31 secured to a lower surface thereof. The pulley member 31 is operatively connected to the pulley 48 by means of the belt or other drive mechanism 49. In addition, the base 30 is mounted on the stationary shaft 42 by means of a bearing unit 33. In this manner, the base member 30 may be rotated about the stationary shaft 42 and the spindle base 41 for rotation within the housing 16. The rotating turret 20 is secured by shafts 51 to a plate member 52. The plate member 52 is secured by means of bolts 53 and sleeve members 54 to the base member 30. In this manner, the rotating turret 20 is designed to rotate together with the base member 30. Thus, as the motor 44 imparts rotation to the gears within the gear mechanism 46 and thus rotates the pulley 48, the belt or other drive connector 49 will impart rotation to the pulley 31, thus rotating the base 30, the upwardly projecting side wall 34, the rim 39 and the rotating turret 20. In another embodiment of the present invention, a separate drive mechanism may be employed for rotating the rim 39 and upwardly projecting side wall 34 at a distinct speed relative to the rotating turret 20.

Disposed within the rotating turret 20 is a stationary cam 60. The stationary cam 60 is secured to the stationary shaft 42 by means of bolts 61. Thus, the stationary cam 60 is mounted in a fixed relationship relative to the rotating turret 20.

As illustrated in FIG. 1, the rotating turret 20 includes a plurality of shafts 51 which are arranged in a specific relationship relative to each ramp section 70A, 70B, 70C, 70D, 70E, 70F, 70G, 70H, etc. Each of the ramp sections 70A-70H are affixed to an individual slide bearing 72A, 72B, 72C, 72D, 72E, 72F, 72G, 72H, etc. Each of the slide bearings 72A-72H are secured on at least one or more shafts 51 to ensure that the individual ramp segment 70A-70H move upwardly without tilting during their travel from a lower position, as illustrated to the left in FIGS. 1 and 3, to an upwardly elevated position as illustrated to the right in FIGS. 1 and 3. In addition, the shafts 51 may be a single rectangular or square rod element for guiding the slide bearing blocks 72A-72H upwardly as the rotating turret 20 is imparted with rotation, thus rotating the individual ramp segment 70A-70H.

As previously discussed, a stationary cam 60 is fixed relative to the rotating turret 20. As illustrated in FIG. 3, the ramp segment 70H includes a slide bearing block 72H. Similarly, the ramp segment 70J includes a slide bearing block 72J. All of the ramp segments are positioned at a fixed inclined plane mounted on the slide bearing block. The slide bearing block 72H includes a cam follower 73H. Similarly, the slide bearing block 72J includes a cam follower 73J. The stationary cam 60 includes a cam surface 65 for engagement with the cam follower 73J and 73H. Thus, when the ramp segment 70J is disposed in a lower position, as illustrated in FIG. 3, the cam follower 73J is disposed on a lower portion of the stationary cam 60 so as to provide a reservoir between the upwardly projecting side wall 34 and the ramp segment 70J. As the rotating turret moves relative to the stationary cam 60, the cam follower 73J moves upwardly on the cam surface 65 to eventually be disposed at the uppermost position of the cam surface 65. As illustrated in FIG. 3, the cam follower 73H is illustrated at the uppermost position of the cam surface 65. In this position, articles which were previously disposed within the reservoir formed by the ramp segment and the upwardly projecting side wall 34 are sequentially elevated upwardly so as to permit the articles 40 to slide downwardly on the ramp segment 70H onto the rim 39.

As illustrated in FIGS. 1 and 3, a retaining wall 75 is mounted adjacent to the rim 39. The retaining wall is utilized to assist in the qualification and orientation of the articles 40 after they are positioned on the rim 39. In addition, a plurality of scallops 77 are spaced around the rim 39. The scallops 77 can be positioned at one of a number of various locations in order to define a space therebetween. In order words, the spacing of the scallops 77 will be determined by the size and shape of the particular article 40 which is supplied to the feeder apparatus 10.

A tooling ring support 80 is mounted adjacent to the retaining wall 75. The retaining wall 75 is secured to the tooling ring support 80 by means of brackets 81, 82 and 83. The brackets 81-83 are secured to frame members 12 of the article feeding apparatus 10.

As illustrated in FIG. 2, the scallops 77 include openings 77A, 77B and 77C disposed along one side thereof. The openings 77A-77C are designed to receive orienting elements located above the scallops to properly orient the articles 40 as they are conveyed around the rim 39 from a delivery point to a discharge point. As illustrated in FIG. 3, an article 40 has been properly qualified and oriented to be received onto a discharge conveyor 85. The articles 40 are thereafter supplied to a work station for further processing.

As illustrated in FIG. 1, the tooling ring support 80 may be adjusted relative to the feeder frame 12. More specifically, an adjustable elevating support member 81A is secured to the feeder frame 12 and the support bracket 81. In this way, the tooling ring support 80 may be vertically and horizontally adjusted relative to the rotating rim 39. In addition, a plurality of apertures 39A are provided in the rim surface 39. In this manner, the positioning of adjacent scallops 77 may be adjusted relative to each other.

FIGS. 4-6 illustrate various views of one of the ramp segments 70H. The ramp segment 70H includes an inclined upper surface with a first inclined portion 91 disposed at an angle relative to a second inclined portion 92. The first inclined portion 91 and second inclined portion 92 are joined at a central section 93. The first inclined portion 91 includes an outer surface 94 with a downwardly extending plate 95 affixed thereto. In addition, the inclined surface 91 includes an edge surface 96 with a downwardly projecting plate 97 secured thereto. Similarly, the second inclined surface 92 includes an end surface 98 with a downwardly extending plate 99 secured thereto. In addition, the second inclined surface 92 includes an edge surface 100 with a downwardly extending plate 101 secured thereto. The inner portion of the first inclined plate 91 and second inclined plate 92 is secured to a bracket 102. The bracket 102 includes apertures 103, 104 disposed therein. The apertures 103 and 104 may be secured to a slide bearing block 72H for positioning the ramp segment 70H for vertical movement relative to the upwardly projecting side wall 34.

As illustrated in FIGS. 7-11, a number of various cross-sectional shapes may be incorporated into the ramp segments. FIG. 7 is similar in shape to the ramp segment 70H illustrated in FIGS. 4-6. More specifically, the ramp segment includes a first inclined surface 91 attached to a second inclined surface 92. A downwardly projecting side wall 101 is secured to the second inclined surface 92. In addition, a downwardly extending wall 97 is secured to the first inclined surface 91.

FIG. 8 illustrates another embodiment of the present invention wherein two V-shaped sections are formed on a ramp segment. The first V-shaped segment includes a first inclined surface 91' secured to a second inclined surface 92'. The second inclined surface 92' is secured to a third inclined surface 93'. In addition, a fourth inclined surface 94' is secured to the third inclined surface 93'. Downwardly extending wall surface 100' is affixed to the fourth inclined surface 94'. In addition, downwardly extending surface 96' is secured to the first inclined surface 91'.

FIG. 9 illustrates another embodiment of a ramp segment. A concave portion 91" is disposed in a central portion of the ramp segment. A downwardly extending wall portion 96" is secured to one side of the concave surface 91". In addition, a downwardly extending surface 100" is connected to the other side of the concave surface 91".

FIG. 10 illustrates another embodiment of a ramp segment which is formed by three rod-shaped elements 106, 107 and 108. The rod elements 106, 107 and 108 are spaced relative to each other to accommodate a particular article 40 which is supplied to the article feeding device 10.

FIG. 11 illustrates another embodiment of a ramp segment including an upper surface 91''' which is substantially flat. A downwardly projecting wall surface 96''' is secured to one edge of the upper surface 91'''. In addition, a downwardly projecting surface 100''' is secured to a second edge of the upper surface 91'''.

Figure 13:
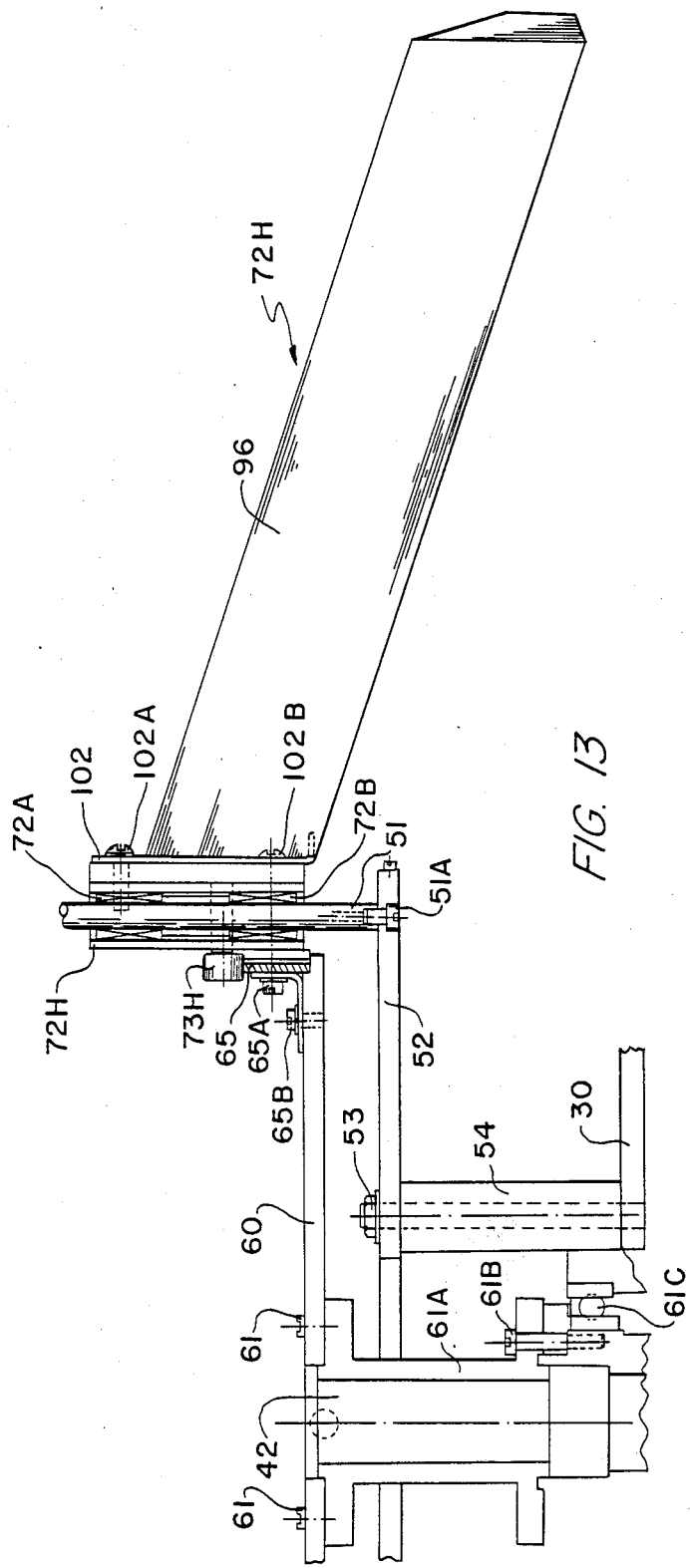
FIG. 13 is a partial elevational view of the ramp segment illustrated in FIG. 12.

FIGS. 12 and 13 illustrate specific connections of the ramp segment 70H secured to the elevating turret 20. A cam follower 73H extends from the slide bearing block 72H.

As illustrated in FIG. 13, the ramp segment 72H is illustrated as being supported adjacent to the lower section of the cam surface 65. The ramp segment 70H includes a downwardly extending side wall 96. The end plate 102 is secured to the slide bearing block 72H by means of bolts 102A, 102B. Bearings 72A, 72B are disposed within the slide bearing block 72H to permit vertical movement of the ramp segment 70H on the shafts 51.

The cam follower 73H is disposed on the cam surface 65. The cam surface 65 is secured by means of bolts 65A, 65B to the stationary cam 60. The stationary cam 60 is secured to the stationary shaft 42 by means of a sleeve 61A and bolts 61. In addition, the sleeve 61A is secured to the stationary shaft of the spindle base 41 by means of bolts 61B. The plate 52 is provided with upwardly extending shafts 51 secured thereto by means of bolts 51A. The plate 52 is secured to the base member 30 by means of sleeves 54 with bolt members 53 extending therethrough. The base 30 is rotatably mounted relative to the stationary shaft 42 by means of a bearing 61C.

IN OPERATION

As illustrated in FIG. 3, articles 40 are delivered by means of a chute 120 to the reservoir section 121 of the article feeding apparatus 10. The reservoir section 121 is formed between the upwardly projecting side wall 34 and individual ramp segments. As illustrated in FIG. 3, ramp segment 70J is disposed adjacent to the reservoir section 121 at this particular point in time. As the elevating turret 20 and the upwardly projecting side wall 34 and rim 39 rotate about the base 30, the cam follower of individual ramp segments will be guided upwardly on the cam surface 65. The articles 40 travel around the article feeding apparatus to be elevated upwardly and discharged onto the rim 39. The articles disposed on the ramp segments 70A-70H, etc., are preoriented prior to discharge from the particular ramp segment onto the rim 39.

Articles deposited onto the rim 39 are singulated on the rim 39 by means of the scallops 77. A qualifying blade is utilized to ensure that only one article 40 is disposed between each of the scallops 77. As the rim 39 rotates relative to the tooling ring support 80, the articles will fall from the rim 39 downwardly to be deposited onto a conveyor 85. Orienting plates are utilized to ensure that the articles deposited onto the conveyor 85 are oriented in the correct position.

The individual ramp segments 70A-70H, etc., are radially disposed around the elevating turret 20 at an inclined position. Each individual ramp segment is secured to a separate sliding block for movement in a vertical direction about the individual shafts 51. The stationary cam 60 which is in a fixed relationship centrally disposed within the elevating turret 20 is utilized to elevate individual ramp segments as the elevating turret 20 and the upwardly projecting side wall 34 rotate. The elevating turret 20 is arranged so that articles disposed on the ramp segments fall outwardly from the central portion of the article feeding apparatus 10 onto the rim 39. The reservoir area 121 serves as an area for receiving articles 40 from the chute 120 and also for receiving articles which are returned to the reservoir 121 due to the qualifying and orienting devices affixed to the tooling ring support 80.

The tapered angle or V-shape of the individual ramp segments provides for a nonbridging or nonwedging of the articles 40 during loading. Parts slide off the ramp segments from a small "V" to a large "V" area. The upwardly projecting side wall 34 can be higher than a conventional feeder bowl due to the arrangement of the ramp segments disposed within the upwardly projecting side wall. In addition, the cam surface 65 can be designed in a variety of various shapes for elevating the articles.

The individual ramp segments in a V-shape and other shapes provide preorientation of the articles 40 before loading of the articles 40 onto the rim 39. The scallops 77 may be positioned around the rim 39 to accurately position the articles 40 upon delivery from the ramp segments.

The elevating turret and the upwardly projecting side wall 34 and rim 39 may be rotated at the same speed or may be rotated at different speeds. In addition, the mechanisms may be rotated clockwise or may be rotated counterclockwise.

A stationary cam 60 may be utilized as discussed hereinabove. In addition, individual pneumatic devices consisting of air cylinders mounted to each of the slide bearing blocks may be utilized. In this second embodiment the cylinders can be actuated by switching an air valve at any given time, thus elevating the ramp segments. The cylinder can be retracted by switching the same air valve. Therefore, the same slide bearing blocks can be designed to accept a cam surface actuation or a pneumatic device actuation.

Designing the ramp segments to have a V-shaped profile is a suitable arrangement for loading cylindrical parts such as bottles for qualification and orientation.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. An article feeding apparatus for supplying articles comprising:
    a base member;
    a side wall member having a first surface and a second surface, said first surface being secured to said base member;
    a rim member being secured to said second surface of said side wall member;
    an elevating turret centrally disposed relative to said base member;
    a plurality of inclined ramp segments operatively connected to said elevating turret and extending from said centrally disposed elevating turret towards said side wall member for forming a reservoir area into which articles may be supplied;
    means for rotating said base member, side wall member, rim and elevating turret at a predetermined speed; and
    elevating means operatively positioned within said elevating turret and operatively connected to said plurality of ramp segments for sequentially elevating predetermined ramp segments while maintaining a constant slope and angle of the ramp segments to permit articles deposited within the reservoir section to be transported by a vertical movement upwardly and to fall by means of gravity outwardly onto the rim.

2. An article feeding apparatus according to claim 1, wherein said side wall member includes an upwardly projecting side wall and an inwardly extending member connected to each other to form a portion of a bowl, connecting legs are provided for connecting said inwardly extending member to said base member.

3. An article feeding apparatus according to claim 2, wherein said upwardly projecting side walls and rim member are substantially circular in shape.

4. An article feeding apparatus according to claim 1, wherein said elevating turret includes a plate member secured to said base member, a plurality of shafts are affixed to said plate member and extend upwardly therefrom, said plurality of ramp segments being operatively connected to individual shafts for vertical movement for initially receiving articles within said reservoir area when said ramp segments are in a lower position and subsequent delivery of articles to said rim member when said ramp segments are elevated.

5. An article feeding apparatus according to claim 1, wherein said ramp segments are V-shaped and include a first inclined surface affixed to a second inclined surface, a downwardly projecting end wall is affixed to an end portion of each of said first and second inclined surfaces, a downwardly projecting edge wall is affixed to an edge surface of each of said first and second inclined surfaces.

6. An article feeding apparatus according to claim 1, wherein said means for rotating said base member, side wall member, rim and elevating turret includes a motor operatively connected to a gear mechanism and a pulley drive for imparting rotation to said base member, side wall member, rim and elevating turret.

7. An article feeding apparatus according to claim 1, and further including slide bearing blocks operatively connected to said elevating turret and individual ramp segments for guiding said ramp segments for movement in a vertical direction.

8. An article feeding apparatus according to claim 7, wherein said elevating means includes a stationary cam and said slide bearing blocks include a cam follower for engagement with said stationary cam for guiding individual slide bearing blocks and corresponding ramp segments to sequentially elevate for initially receiving articles within said reservoir area and subsequent delivery of articles to said rim member.

9. An article feeding apparatus according to claim 1, and further including a plurality of scallops selectively positioned around said rim member with a predetermined spacing for accommodating articles of a predetermined size.

10. An article feeding apparatus according to claim 1, wherein said ramp segments include two V-shaped member disposed on an upper surface thereof for preorienting articles supplied thereto.

11. An article feeding apparatus according to claim 1, wherein said ramp segments include a concave upper surface for preorienting articles supplied thereto.

12. An article feeding apparatus according to claim 1, wherein said ramp segments include a plurality of rods spaced relative to each other for receiving articles for subsequent discharge.

13. An article feeding apparatus according to claim 1, wherein said ramp segments include a substantially planar upper surface for receiving articles for subsequent discharge.

14. An article feeding apparatus according to claim 1, wherein said ramp segments include side edges and further including downwardly projecting plates extending from said side edges of each of said ramp segments for retaining articles on adjacent ramp segments as said ramp segments are vertically moved up and down.

15. A method of feeding articles comprising the following steps:
    supplying articles in a reservoir area formed by a plurality of inclined ramp segments and a side wall member;
    rotating the ramp segments and the side wall member;
    sequentially vertically elevating individual ramp segments while maintaining a constant slope and angle of the ramp segments for discharging articles from said elevated ramp segment to a rim member of the side wall member, said articles being discharged by means of gravity from said ramp segment to said rim member; and
    continuing the supply of articles and the rotation of the ramp segments and the side wall member for continuous delivery of articles from said reservoir area to said rim member.

16. An article feeding apparatus for supplying articles comprising:

a base member;

a side wall member having a first surface and a second surface, said first surface being secured to said base member;

a rim member being secured to said second surface of said side wall member;

an elevating turret centrally disposed relative to said base member;

a plurality of inclined ramp segments operatively connected to said elevating turret and extending from said centrally disposed elevating turret towards said side wall member for forming a reservoir area into which articles may be supplied;

means for rotating said base member, side wall member, rim and elevating turret at a predetermined speed; and elevating means operatively positioned within said elevating turret and operatively connected to said plurality of ramp segments for sequentially elevating predetermined ramp segments to permit articles deposited within the reservoir section to be transported upwardly and fall by means of gravity outwardly onto the rim;

said elevating turret includes a plate member secured to said base member, a plurality of shafts are affixed to said plate member and extend upwardly therefrom, said plurality of ramp segments being operatively connected to individual shafts for vertical movement for initially receiving articles within said reservoir area when said ramp segments are in a lower position and subsequent delivery of articles to said rim member when said ramp segments are elevated.

17. An article feeding apparatus according to claim 16, wherein said side wall member includes an upwardly projecting side wall and an inwardly extending member connected to each other to form a portion of a bowl, connecting legs are provided for connecting said inwardly extending member to said base member.

18. An article feeding apparatus according to claim 17, wherein said upwardly projecting side walls and rim member are substantially circular in shape.

19. An article feeding apparatus according to claim 16, wherein said ramp segments are V-shaped and include a first inclined surface affixed to a second inclined surface, a downwardly projecting end wall is affixed to an end portion of each of said first and second inclined surfaces, a downwardly projecting edge wall is affixed to an edge surface of each of said first and second inclined surfaces.

20. An article feeding apparatus according to claim 16, wherein said means for rotating said base member, side wall member, rim and elevating turret includes a motor operatively connected to a gear mechanism and a pulley drive for imparting rotation to said base member, side wall member, rim and elevating turret.

21. An article feeding apparatus according to claim 16, and further including slide bearing blocks operatively connected to said elevating turret and individual ramp segments for guiding said ramp segments for movement in a vertical direction.

22. An article feeding apparatus according to claim 21, wherein said elevating means includes a stationary cam and said slide bearing blocks include a cam follower for engagement with said stationary cam for guiding individual slide bearing blocks and corresponding ramp segments to sequentially elevate for initially receiving articles within said reservoir area and subsequent delivery of articles to said rim member.

23. An article feeding apparatus according to claim 16, and further including a plurality of scallops selectively positioned around said rim member with a predetermined spacing for accommodating articles of a predetermined size.

24. An article feeding apparatus according to claim 16, wherein said ramp segments include two V-shaped member disposed on an upper surface thereof for preorienting articles supplied thereto.

25. An article feeding apparatus according to claim 16, wherein said ramp segments include a concave upper surface for preorienting articles supplied thereto.

26. An article feeding apparatus according to claim 16, wherein said ramp segments include a plurality of rods spaced relative to each other for receiving articles for subsequent discharge.

27. An article feeding apparatus according to claim 16, wherein said ramp segments include a substantially planar upper surface for receiving articles for subsequent discharge.

28. An article feeding apparatus according to claim 16, wherein said ramp segments include side edges and further including downwardly projecting plates extending from said side edges of each of said ramp segments for retaining articles on adjacent ramp segments as said ramp segments are vertically moved up and down.

* * * * *